US006639554B2

United States Patent
Kim et al.

(10) Patent No.: US 6,639,554 B2
(45) Date of Patent: Oct. 28, 2003

(54) APPARATUS AND METHOD FOR TRACKING LOCATION OF MOBILE STATION

(75) Inventors: Eung-Bae Kim, Daejeon (KR); Seung-Hwan Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 10/102,653

(22) Filed: Mar. 22, 2002

(65) Prior Publication Data

US 2003/0117320 A1 Jun. 26, 2003

(30) Foreign Application Priority Data

Dec. 26, 2001 (KR) .......................................... 2001-84932

(51) Int. Cl.[7] ................................................. G01S 3/02
(52) U.S. Cl. ...................................................... 342/457
(58) Field of Search ................................. 342/373, 450, 342/457; 455/456, 457

(56) References Cited

U.S. PATENT DOCUMENTS

| | | | | |
|---|---|---|---|---|
| 5,386,370 A | * | 1/1995 | Woo | ............................ 364/516 |
| 5,873,048 A | * | 2/1999 | Yun | ............................ 455/562 |
| 6,130,638 A | * | 10/2000 | Winter et al. | ................ 342/147 |
| 6,246,884 B1 | | 6/2001 | Karmi et al. | |
| 6,252,867 B1 | | 6/2001 | Pfeil et al. | |
| 6,300,905 B1 | | 10/2001 | Chen et al. | |

* cited by examiner

Primary Examiner—Dao Phan
(74) Attorney, Agent, or Firm—Jacobson Holman PLLC (57) ABSTRACT

Disclosed is an apparatus and method for determining a mobile station's precise three-dimensional location in a simple way, that includes a beam-forming antenna's receiving of a signal from the mobile station; measuring the distance between a wireless base station and the mobile station from the received signal; determining the mobile station's azimuth angle by horizontal scanning of the beam-forming antenna and the mobile station's elevation angle by vertical scanning of the beam-forming antenna; and updating the mobile station's distance, azimuth angle, and elevation angle at regular time intervals, thereby acquiring the mobile station's three-dimensional location simply and with precision.

13 Claims, 7 Drawing Sheets

Acquisition

FIG.5B

Tracking

APPARATUS AND METHOD FOR TRACKING LOCATION OF MOBILE STATION

BACKGROUND OF THE INVENTION (a) Field of the Invention

The present invention relates to a location tracking apparatus and method. More specifically, the present invention relates to an apparatus and method for tracking three-dimensional locations of a mobile station used for mobile communication systems.

(b) Description of the Related Art

With the progress of mobile communication systems, persistent attempts have been made to utilize mobile communication networks in a variety of fields as well as the existing voice telephone communication and data services. In addition, various location tracking methods have been reported for using location information in providing position-based services such as emergency rescue, vehicle tracking, searching for missing children, and the like.

The GPS (Global Positioning System)-based tracking technology is an example of the location tracking methods. The GPS-based tracking technology that uses location information sent from four GPS satellites moving around the earth for representation of the current location is known to provide very precise location information. However, this technology requires a separate GPS receiver of which the price rises in proportion to the precision of location tracking, and is thus unsuitable for use in tracking services using wireless telephone networks.

Figure 1:
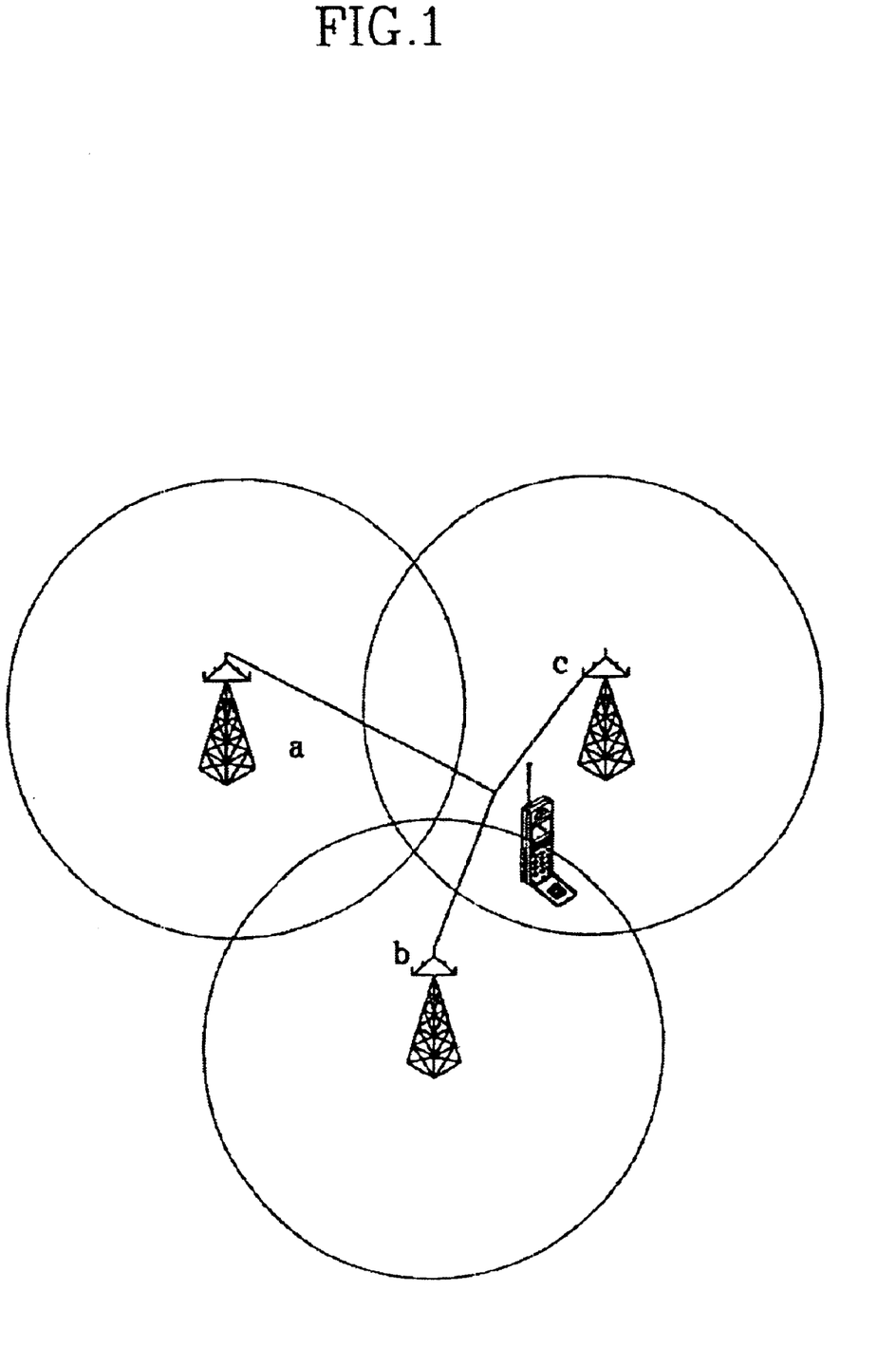
FIG. 1 is an illustration showing the cell structure of a mobile communication system for explaining a location measuring method using the triangulation technology in accordance with prior art.

Another method for tracking the location of a mobile station is based on triangulation technology. FIG. 1 shows a cell structure of a mobile communication system for explaining a location tracking method using triangulation technology in accordance with prior art.

In the mobile communication network that has a cell structure centering on base stations, a mobile station receives signals from at least three base stations a, b, and c, and determines its relative location with respect to each base station using the base station's coordinate and signal-sending time. However, this method requires precise time synchronization among the base stations for the mobile station's measuring of a precise time of arrival of the received signals, and it demands that the individual base stations increase the power of the output signals for the mobile station's acquiring of the signals simultaneously from the at least three base stations.

To overcome this problem in regard to synchronization and efficiency, methods have been proposed for tracking the location of a mobile station using a single base station.

For example, U.S. Pat. No. 6,300,905 discloses a method for tracking the location of a mobile station using a single base station in the CDMA (Code Division Multiple Access) and TDMA (Time Division Multiple Access) systems. In the method, the single base station measures the mobile station's RF forward link signal and the propagation-delay time to calculate the distance to the mobile station, and utilizes at least three multiple sector antennas to measure the mobile station's azimuth angle.

U.S. Pat. No. 6,252,867 discloses a method for tracking two-dimensional locations of a mobile station using a single base station in the CDMA system having a multiple channel structure. The base station in this method also uses the propagation-delay time to obtain the distance to the mobile station, and it measures the mobile station's azimuth angle using a plurality of phased array antennas.

Though only a single base station is used in tracking of the mobile station's location, neither of the methods can provide three-dimensional location information while considering the altitude of the mobile station, but only two-dimensional location information such as distance and azimuth angle. The methods also have a problem in that the resolution and precision of angle measurements are dependent on the number of antennas.

SUMMARY OF THE INVENTION

It is an object of the present invention to provide an apparatus and method for tracking a mobile station's precise three-dimensional location information simply by using a single base station in a mobile communication system.

In one aspect of the present invention, there is provided an apparatus for determining the location of a mobile station that includes: a beam-forming antenna for receiving a signal from the mobile station; a distance detector for measuring the distance between a wireless base station and the mobile station from the signal received by the beam-forming antenna; an azimuth angle detector for measuring an azimuth angle of the mobile station with respect to the wireless base station by horizontal scanning of the beam-forming antenna; an elevation angle detector for measuring an elevation angle of the mobile station with respect to the wireless base station by vertical scanning of the beam-forming antenna; and a location determiner for calculating the output signals of the distance detector, the azimuth angle detector and the elevation angle detector, determining the location of the mobile station and updating it.

The distance detector includes a time-distance detector for measuring the propagation-delay time of the signal received by the beam-forming antenna and calculating the distance between the wireless base station and the mobile station from the propagation-delay time, and/or a power-distance detector for measuring the power of the signal received by the beam-forming antenna and calculating the distance between the wireless base station and the mobile station from the power.

After determining an initial location of the mobile station, the location determiner continues to receive information about the mobile station's distance, azimuth angle and elevation angle at regular time intervals, takes the respective averages of the distance, the azimuth angle and the elevation angle and updates the location of the mobile station based on the averages.

In another aspect of the present invention, there is provided a method for determining the location of a mobile station, by which at least one wireless base station including a beam-forming antenna for generating an antenna beam in multiple directions determines the location of the mobile station, the method including: (a) receiving a signal from the mobile station; (b) calculating the distance between the wireless base station and the mobile station from the received signal; (c) scanning the antenna beam of the beam-forming antenna in a horizontal direction; (d) determining a first position of the beam-forming antenna at the peak power of the received signal during the horizontal scanning, and measuring an azimuth angle between the initial position of the beam-forming antenna and the first position; (e) scanning the antenna beam of the beam-forming antenna in a vertical direction; (f) determining a second position of the beam-forming antenna at the peak power of the received signal during the vertical scanning, and measuring an elevation angle between the initial position of the beam-forming antenna and the second position; (g) putting the distance, the azimuth angle and the elevation angle together to acquire an initial location of the mobile station; and (h) updating the acquired initial location of the mobile station at regular time intervals.

The distance calculation step (b) includes measuring the propagation-delay time of the received signal and calculating the distance from the propagation-delay time; or measuring the power of the received signal and comparing it with the power of a signal sent from the wireless base station to calculate the distance.

The location updating step (h) includes taking the respective averages of the distance, the azimuth angle and the elevation angle for a predetermined time interval and determining the location value of the mobile station as the averages.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

In the following detailed description, only the preferred embodiment of the invention has been shown and described, simply by way of illustration of the best mode contemplated by the inventor(s) of carrying out the invention. As will be realized, the invention is capable of modification in various obvious respects, all without departing from the invention. Accordingly, the drawings and description are to be regarded as illustrative in nature, and not restrictive.

Figure 2:
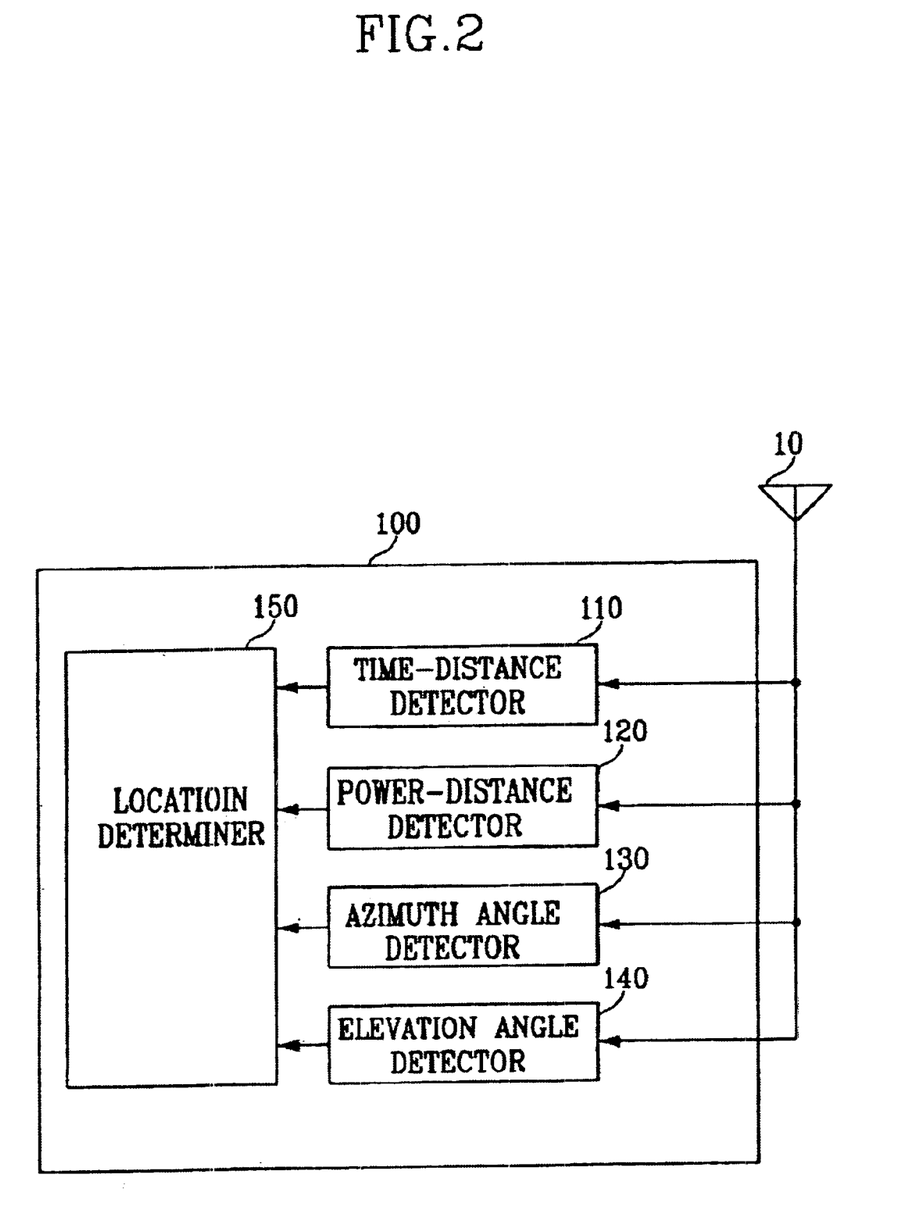
FIG. 2 is a block diagram showing a block diagram of an apparatus for tracking the location of a mobile station in accordance with an embodiment of the present invention.

FIG. 2 illustrates the structure of an apparatus for tracking the location of a mobile station in accordance with an embodiment of the present invention.

A beam-forming antenna 10 is built in a wireless base station and generates antenna beams in multiple directions, including horizontal and vertical directions.

A receiver 100 comprises a time-distance detector 110, a power-distance detector 120, an azimuth angle detector 130, and an elevation angle detector 140, which receive signals from a mobile station via the beam-forming antenna 10 and measure the mobile station's radius, azimuth angle, and elevation angle, respectively. The time-distance detector 110 detects a propagation-delay time corresponding to the difference between the mobile station's signal-sending time and the base station's signal-receiving time from the signal received from the beam-forming antenna 10, and multiplies the propagation-delay time by a propagation velocity to obtain a distance R to the mobile station. The power-distance detector 120 detects a received power from the signal received from the beam-forming antenna 10 and obtains a distance R to the mobile station from the difference between the received power and the mobile station's sending power. Determination of the distance from the difference between received signal's power and sending signal's power is based on the fact that the intensity of propagation in free space is inversely proportional to the square of the distance. The azimuth angle detector 130 scans the antenna beams generated from the beam-forming antenna 10 by 0 to 360 degrees in the horizontal direction and compares the received signals' powers to determine the horizontal beam angle at the peak power as the mobile station's azimuth angle θ. The elevation angle detector 140 scans the antenna beams generated from the beam-forming antenna 10 by 0 to 90 degrees in the vertical direction and compares the received signals' powers to determine the vertical beam angle at the peak received power as the mobile station's elevation angle γ.

A location determiner 150 receives the output signals of the time-distance detector 110, the power-distance detector 120, the azimuth angle detector 130, and the elevation angle detector 140, i.e., the mobile station's three-dimensional location information, to acquire the initial location of the mobile station, and it continues to send the location information at regular time intervals, and it updates the initial location value. The updated location value of the mobile station can be determined by averaging the initial varied location value and the varied location values acquired after an elapse of time. The location value calculated by the location determiner 150 is a representation of three-dimensional polar coordinates, each consisting of radius, azimuth angle, and elevation angle, and may be converted to the three-dimensional Cartesian coordinate system by Cartesian coordinate transformation. The coordinate transformation method is known to those skilled in the art and will not be described.

Figure 3:
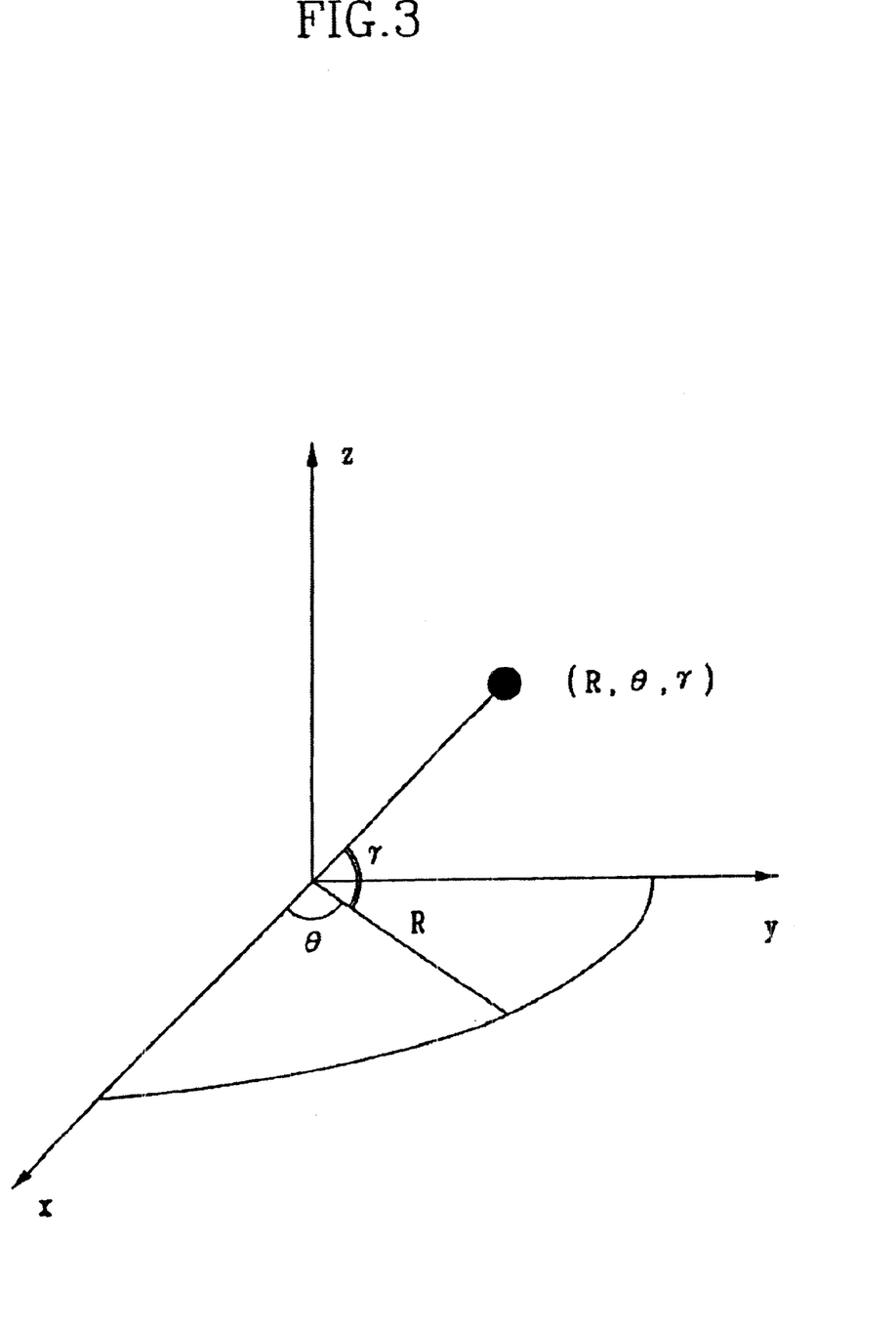
FIG. 3 is a coordinate diagram explaining the fundamental notion of a method for tracking the location of a mobile station in accordance with another embodiment of the present invention.

FIG. 3 is a coordinate diagram explaining the fundamental notion of a method for tracking the location of a mobile station in accordance with another embodiment of the present invention.

The location of a mobile station in three-dimensional space may be represented as either a point (x, y, z) in the Cartesian coordinate system or a point (R, θ, γ) in the polar coordinate system. Based on this fact, the present invention measures each mobile station's radius R, azimuth angle θ and elevation angle γ with respect to a single base station to obtain the mobile station's precise location. The radius of the mobile station can be measured from the signal received at the base station.

There are two methods of finding the distance between the mobile station and the base station. One is measuring the propagation-delay time of the received signal and finding the distance between the mobile station and the base station from the propagation-delay time. Because the frame of the signal sent from the mobile station contains information about the signal-sending time, the receiver compares the signal-sending time and the signal-receiving time to obtain the propagation-delay time and multiplies the propagation-delay time by the propagation velocity to calculate the distance. For precise measurements of the propagation-delay time, precise time synchronization between the base station and the mobile station is required.

The other method is measuring the power of the signal received by the base station and finding the distance between the mobile station and the base station from the received power. The frame of the signal sent from the mobile station contains information about the sending power, and a comparison between the mobile station's sending power and the base station's received power gives a loss power. The propagation distance can be calculated from the loss power, because the intensity of propagation in free space is inversely proportional to the square of the distance.

The two measurement methods may cause errors and must be used simultaneously. More specifically, the former method that measures the propagation-delay time may determine the mobile station's location imprecisely due to propagation delay caused by multiple paths as if the mobile station is farther from the base station than it is; and the latter one that measures the base station's received power has a problem in finding the precise received power because of fading. It is therefore required that the wireless base station should use both measurements, and keep information about the propagation-delay time and the received power. Using the present invention in the millimeter-wave band makes the effect of multiple paths negligible due to the characteristic of propagation, and realizes the cell structure of the base station in the pico-cell unit that secures line of sight (LOS), further reducing the error of distance measurements.

The azimuth angle θ and the elevation angle γ are measured with the beam-forming antenna of the wireless base station. In regard to the azimuth angle θ, the beam-forming antenna is horizontally rotated by 360 degrees to detect a position at the peak power of the received signal, at which time the rotational angle of the beam-forming antenna is set as the azimuth angle. The precision of the azimuth angle measurement is dependent on the resolution of the beam-forming antenna. Regarding the elevation angle γ, the beam of the beam-forming antenna is scanned in the range of from 0 to 90 degrees to select a position at the peak power of the received signal, and set the beam angle at this time as the mobile station's elevation angle.

A combination of the mobile station's radius, azimuth angle and elevation angle thus obtained gives the mobile station's precise spatial location with respect to the base station antenna.

Figure 4:
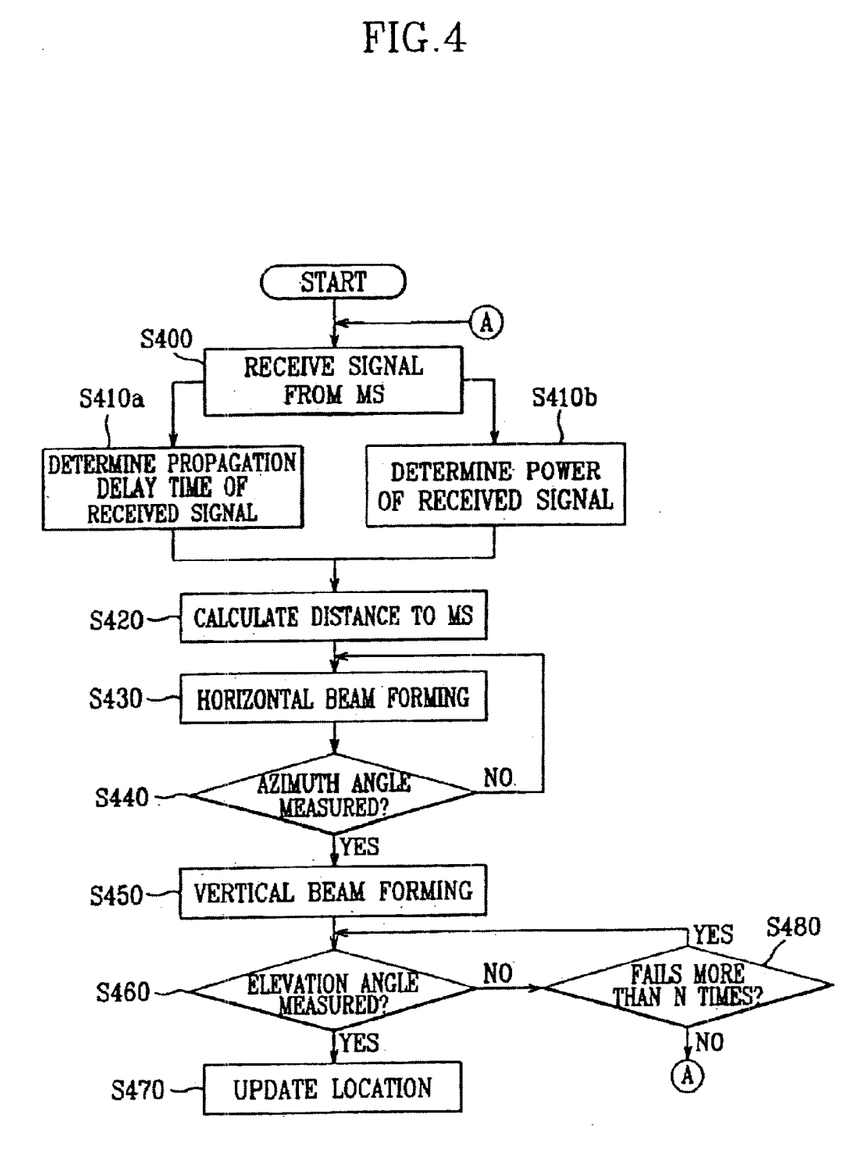
FIG. 4 is a flow chart showing a method for tracking the location of a mobile station in accordance with still another embodiment of the present invention.
Figure 5A:
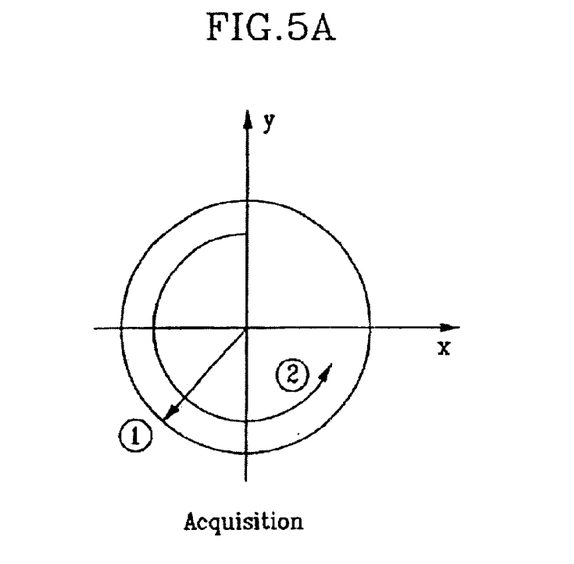
FIG. 5a is a graphical illustration explaining a location acquisition step in accordance with the location tracking method of the present invention.
Figure 5B:
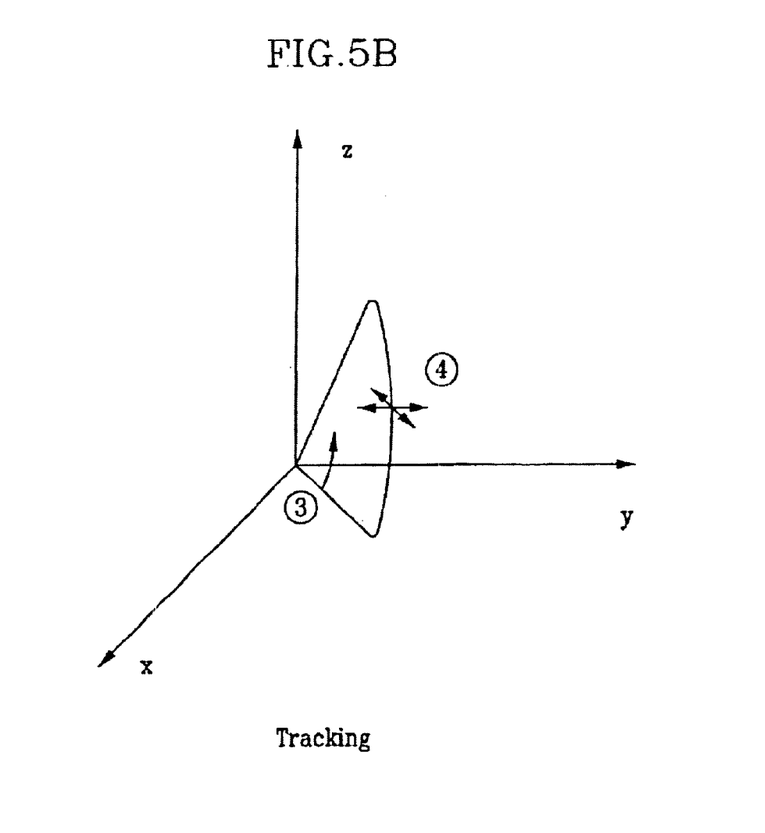
FIG. 5b is a graphical illustration explaining a location tracking step in accordance with the location tracking method of the present invention.

FIG. 4 is a flow chart showing a method for determining the location of a mobile station in accordance with still another embodiment of the present invention. FIGS. 5a and 5b are graphical illustrations explaining a location acquisition step and a location tracking step in accordance with the location determination method of the present invention, respectively.

First, the base station acquires the mobile station's radius R and azimuth angle θ as shown in FIG. 5a.

For this purpose, the receiver 100 of the base station receives a signal from the mobile station via the antenna 10, in step 400. The received signal contains information concerning the mobile station's signal-sending time and power as well as control signals related to call origination. The base station detects the propagation-delay time and the received power from the received signal, in steps 410a and 410b, and finds the distance between the mobile station and the base station, in step 420. The distance measurement is performed in the same manner as described above with reference to FIG. 3.

Subsequently, the base station scans the antenna beam by 0 to 360 degrees in the horizontal direction, in step 430, and measures the azimuth angle, in step 440. The azimuth angle is determined as the angle between the position of the beam-forming antenna at the peak power of the received signal during the horizontal scanning and the initial position of the antenna. The base station repeats the horizontal scanning until it acquires the precise measurement of the azimuth angle. The mobile station's approximate location is derived from the distance between the base station and the mobile station and the azimuth angle.

As shown in FIG. 5b, the base station measures the mobile station's elevation angle at that location based on the above-determined distance and azimuth angle and determines the mobile station's precise location represented by distance, azimuth angle and elevation angle.

For this purpose, the base station scans the antenna beam by 0 to 90 degrees in the vertical direction, in step 450, and measures the elevation angle, in step 460. The elevation angle is determined as the angle between the position of the beam-forming antenna at the peak power of the received signal during the vertical scanning, and the initial position of the antenna. The base station repeats the vertical scanning until it acquires the precise measurement of the elevation angle.

The base station continues to acquire the mobile station's distance, azimuth, and elevation angle for a predetermined time interval, and updates the mobile station's location from a combination of the measurements to track the more precise location value, in step 470. In the tracking step, the base station determines the mobile station's initial location value and takes the respective averages of the distance, the azimuth angle, and the elevation angle at regular time intervals to update the mobile station's location. Namely, assuming that the moving speed of the mobile station is far slower than the base station's tracking update speed, the base station takes the respective averages of the distance, the azimuth angle, and the elevation angle for a predetermined time interval and increases the precision of the measurement using the updated location value. Integrating the parameters for a predetermined time interval reduces the effect of the measurement error that is usually zero on average, and results in the more precise measurement to that extent. If it fails to measure the elevation angle N times in a row, in step 480, the base station returns to the step of acquiring the mobile station's distance and azimuth angle.

The above-stated method for tracking the location of a mobile station can be realized more simply in the TDMA system. Now, a description will be given to another embodiment of the present invention using the TDMA system.

Figure 6:
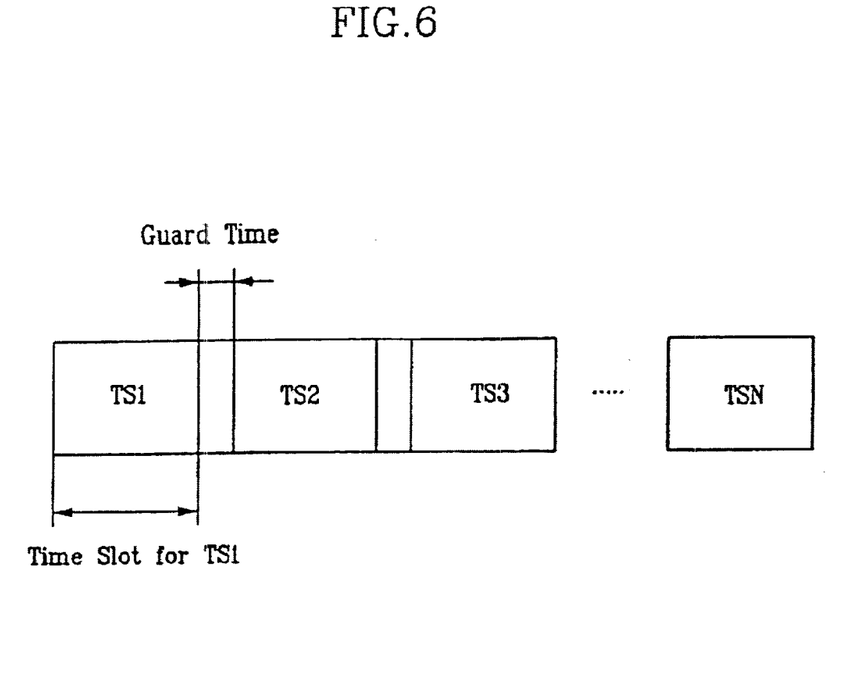
FIG. 6 shows allocation of time slots by mobile stations in a TDMA (Time Division Multiple Access) reverse link.
Figure 7:
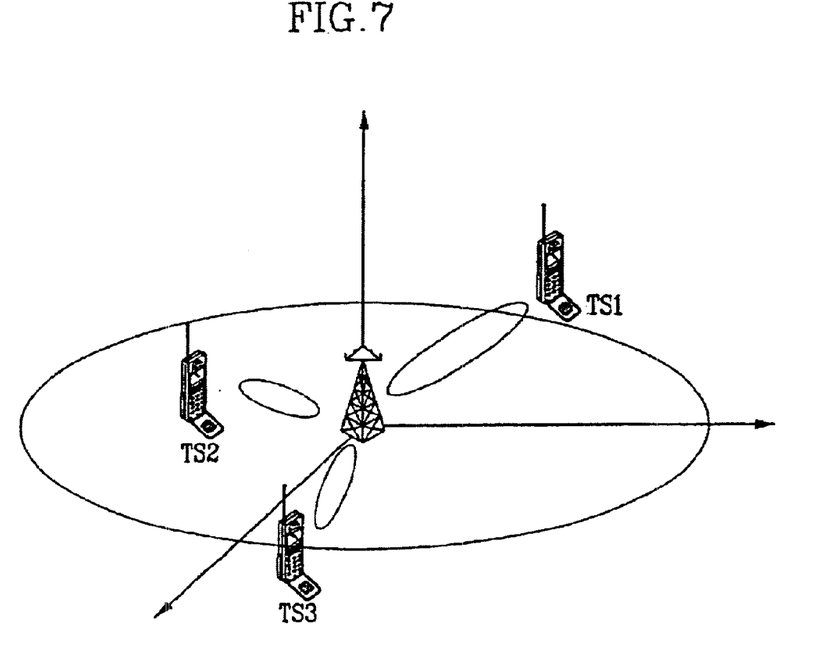
FIG. 7 shows mobile stations' locations centering on a TDMA base station antenna.

FIG. 6 shows allocation of time slots by mobile stations in a TDMA reverse link, and FIG. 7 shows the locations of the mobile stations with respect to a TDMA base station antenna.

In the TDMA system, the reverse link has time slots allocated to the individual mobile stations TS1, TS2, TS3, . . . and TSn, and guard times disposed between the time slots so as not to have the time slots overlap one another. The base station controls the mobile stations transmission time so that the individual mobile stations TS1, TS2, TS3, . . . and TSn can send data via their own time slots. It is thus possible in the TDMA system to acquire the distance between the base station and the mobile station, i.e., the radius R, directly after the mobile station's sending of a signal. This is because the base station already has the information of the propagation-delay time based on the distance to the mobile station, in order to control data transmission in accord with the mobile station's time slot. Accordingly, the base station can determine the distance to the mobile station immediately by performing a type of ranging according to the standard of the TDMA system without using a separate propagation-delay-time detector.

The mobile station's azimuth angle and elevation angle can also be readily determined in the TDMA system in the same manner as described above. For example, the azimuth angle at the location of a first mobile station TS1 is measured as a beam angle when the received power is at peak while the beam is rotated by 0 to 360 degrees in the horizontal direction for the first mobile station's signal-sending time. Similarly, the elevation angle at the location of the first mobile station TS1 is measured as a beam angle acquired at the peak received power while the beam is rotated by 0 to 90 degrees in the vertical direction. The tracking parameters are mutually time-exclusive by mobile stations in the TDMA system. So, the base station can readily determine the mobile station's location only from information about the mobile station's time slot without using a separate division system.

In the TDMA system, the base station can set the beam-forming antenna precisely at the receiving position to the base station's received frame, i.e., the mobile station's sending frame, in advance, based on location information acquired from the individual mobile station's time slot, in which case it receives the mobile station's sending power at the maximum with enhancement of the signal-to-noise ratio and hence the performance. In this regard, the location information in the TDMA system may contribute to enhancement of the system performance as well as location information services. The time slots, each allocated to the individual mobile station, are variable every time frame. The base station positions the beam-forming antenna based on the location of the mobile station and the time slot mapping table.

Figure 8:
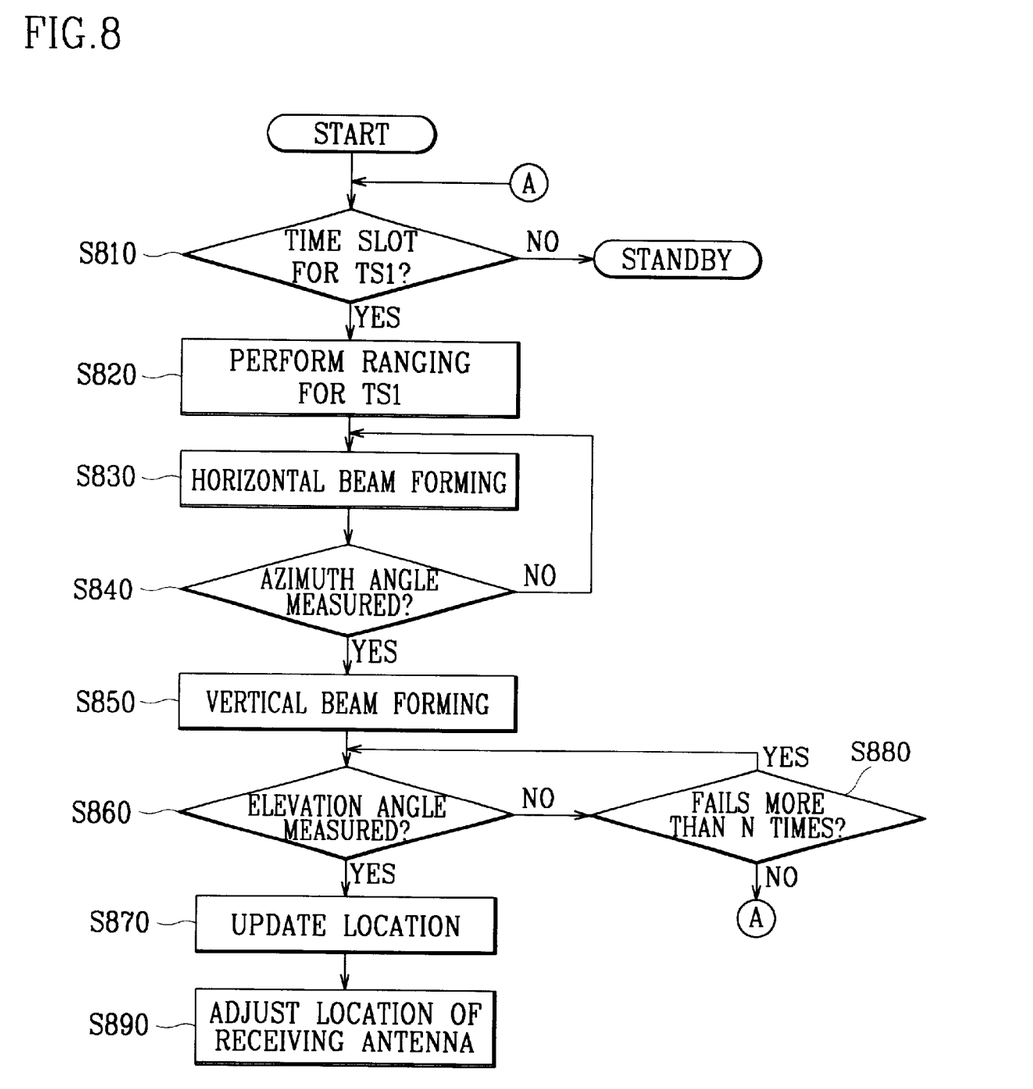
FIG. 8 is a flow chart showing a method for tracking the location of a mobile station in a TDMA system in accordance with still another embodiment of the present invention.

FIG. 8 illustrates a method for tracking the location of a mobile station in a TDMA system in accordance with still another embodiment of the present invention, which exemplifies a location determination of the first mobile station ST1.

First, when it comes to the time slot of the first mobile station TS1, in step 810, the base station performs a ranging procedure for the first mobile station ST1, in step 820. Thus the base station can detect the propagation delay time and the received power and determine the distance R to the first mobile station TS1. The base station scans the beam of the beam-forming antenna by 0 to 360 degrees in the horizontal direction, in step 830, and measures the azimuth angle, in step 840. The azimuth angle of the first mobile station TS1 is determined as the angle between the position of the beam-forming antenna at the peak power of the received signal during the horizontal scanning, and the initial position of the antenna. The base station repeats the horizontal scanning until it acquires the precise measurement of the azimuth angle.

The base station also scans the beam of the beam-forming antenna by 0 to 90 degrees in the vertical direction, in step 850, and measures the elevation angle, in step 860. The elevation angle of the first mobile station TS1 is determined as the angle between the position of the beam-forming antenna at the peak power of the received signal during the vertical scanning, and the initial position of the antenna. The base station repeats the vertical scanning until it acquires the precise measurement of the elevation angle.

Subsequently, the base station continues to acquire the first mobile station's distance, azimuth angle, and elevation angle for a predetermined time interval and updates the mobile station's location from a combination of the measurements to track the more precise location value, in step 870. The method for updating the mobile station's location in the tracking step is as described above. If it fails to measure the elevation angle N times in a row, in step 880, the base station returns to the step of acquiring the first mobile station's distance and azimuth angle. The base station sets the beam-forming antenna precisely at the receiving position of the corresponding mobile station in advance, based on the location information acquired from the mobile station's time slot, in step 890. The base station in this case receives the mobile station's sending power at the maximum with enhancement of the signal-to-noise ratio and hence the performance.

As described above, the present invention determines the three-dimensional location of a mobile station from information of a single base station without using a separate location determination unit such as the GPS, which contributes to economy and enhancement of precision in location determination. The present invention also secures easier location determination in the case of the TDMA system, and enhances the performance of the base station based on the measured location information.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. An apparatus for tracking a location of a mobile station, comprising:

a beam-forming antenna for receiving a signal from the mobile station;

a distance detector for measuring the distance between a wireless base station and the mobile station from the signal received by the beam-forming antenna;

an azimuth angle detector for measuring an azimuth angle of the mobile station with respect to the wireless base station by horizontal scanning of the beam-forming antenna;

an elevation angle detector for measuring an elevation angle of the mobile station with respect to the wireless base station by vertical scanning of the beam-forming antenna; and a location determiner for calculating the output signals of the distance detector, the azimuth angle detector, and the elevation angle detector, determining the location of the mobile station and updating it.

2. The apparatus as claimed in claim 1, wherein the distance detector comprises a time-distance detector for measuring the propagation-delay time of the signal received by the beam-forming antenna and calculating the distance between the wireless base station and the mobile station from the propagation-delay time.

3. The apparatus as claimed in claim 1, wherein the distance detector comprises a power-distance detector for measuring the power of the signal received by the beam-forming antenna, and calculating the distance between the wireless base station and the mobile station from the power.

4. The apparatus as claimed in claim 1, wherein the distance detector comprises a time-distance detector for measuring the propagation-delay time of the signal received by the beam-forming antenna and calculating the distance between the wireless base station and the mobile station from the propagation-delay time, and a power-distance detector for measuring the power of the signal received by the beam-forming antenna and calculating the distance between the wireless base station and the mobile station from the power.

5. The apparatus as claimed in claim 1, wherein after determining an initial location of the mobile station, the location determiner continues to receive information about the mobile station's distance, azimuth angle, and elevation angle at regular time intervals, takes the respective averages of the distance, the azimuth angle, and the elevation angle and updates the location of the mobile station based on the averages.

6. A method for tracking a location of a mobile station, by which at least one wireless base station including a beam-forming antenna for generating an antenna beam in multiple directions tracks the location of the mobile station, the method comprising:

(a) receiving a signal from the mobile station;

(b) calculating the distance between the wireless base station and the mobile station from the received signal;

(c) scanning the antenna beam of the beam-forming antenna in a horizontal direction;

(d) selecting a first position of the beam-forming antenna at the peak power of the received signal during the horizontal scanning, and measuring an azimuth angle between the initial position of the beam-forming antenna and the first position;

(e) scanning the antenna beam of the beam-forming antenna in a vertical direction;

(f) selecting a second position of the beam-forming antenna at the peak power of the received signal during the vertical scanning, and measuring an elevation angle between the initial position of the beam-forming antenna and the second position;

(g) putting the distance, the azimuth angle, and the elevation angle together to acquire an initial location of the mobile station; and (h) updating the acquired initial location of the mobile station at regular time intervals.

7. The method as claimed in claim 6, wherein the distance calculation step (b) comprises measuring the propagation-delay time of the received signal, and calculating the distance from the propagation-delay time.

8. The method as claimed in claim 6, wherein the distance calculation step (b) comprises measuring the power of the received signal and comparing it with the power of a signal sent from the wireless base station to calculate the distance.

9. The method as claimed in claim 6, wherein the location updating step (h) comprises taking the respective averages of the distance, the azimuth angle, and the elevation angle for a predetermined time interval, and setting the location value of the mobile station as the averages.

10. A method for determining a location of a TDMA (Time Division Multiple Access) mobile communication system, in which the TDMA mobile communication system includes a plurality of mobile stations and a wireless base station having a beam-forming antenna for generating an antenna beam in multiple directions, the method comprising:

(a) measuring the distance between the wireless base station and an i-th mobile station for a time slot interval allocated to the i-th mobile station;

(b) scanning the antenna beam of the beam-forming antenna in a horizontal direction for the time slot interval allocated to the i-th mobile station, selecting a first position at the peak power of a signal sent from the i-th mobile station to the wireless base station during the scanning, and calculating an azimuth angle of the mobile station from the first position;

(c) scanning the antenna beam of the beam-forming antenna in a vertical direction for the time slot interval allocated to the i-th mobile station, selecting a second position at the peak power of the signal sent from the i-th mobile station to the wireless base station during the scanning, and calculating an elevation angle of the mobile station from the second position;

(d) putting the distance, the azimuth angle, and the elevation angle together to acquire an initial location of the mobile station; and (e) updating the acquired initial location of the mobile station at regular time intervals.

11. The method as claimed in claim 10, wherein the distance measuring step (a) comprises finding the distance using TDMA ranging parameters.

12. The method as claimed in claim 10, wherein the location updating step (e) comprises taking the respective averages of the distance, the azimuth angle, and the elevation angle for a predetermined time interval, and updating the average values as the location values of the mobile station.

13. The method as claimed in claim 10, further comprising setting the beam-forming antenna at the location of the i-th mobile station based on the location information derived from the time slot of the i-th mobile station.

* * * * *